US009286904B2

(12) United States Patent
Wakeland et al.

(10) Patent No.: US 9,286,904 B2
(45) Date of Patent: Mar. 15, 2016

(54) ADJUSTING A DATA RATE OF A DIGITAL AUDIO STREAM BASED ON DYNAMICALLY DETERMINED AUDIO PLAYBACK SYSTEM CAPABILITIES

(75) Inventors: Carl Wakeland, Scotts Valley, CA (US); William Herz, Hayward, CA (US)

(73) Assignee: ATI Technologies ULC, Markham, Ontario (CA)

( * ) Notice: Subject to any disclaimer, the term of this patent is extended or adjusted under 35 U.S.C. 154(b) by 902 days.

(21) Appl. No.: 13/412,987

(22) Filed: Mar. 6, 2012

(65) Prior Publication Data

US 2013/0236032 A1 Sep. 12, 2013

(51) Int. Cl.
*G06F 17/00* (2006.01)
*G10L 19/24* (2013.01)
*G10L 19/002* (2013.01)

(52) U.S. Cl.
CPC ............... *G10L 19/24* (2013.01); *G10L 19/002* (2013.01)

(58) Field of Classification Search
CPC ....... G10L 19/24; G10L 19/002; G10L 25/69; H04R 29/00
USPC ........................................ 700/94; 381/56–60
See application file for complete search history.

(56) References Cited

U.S. PATENT DOCUMENTS

| | | | | |
|---|---|---|---|---|
| 4,827,515 | A * | 5/1989 | Reich | 381/7 |
| 8,031,891 | B2 | 10/2011 | Ball et al. | |
| 2011/0116642 | A1 | 5/2011 | Hall et al. | |
| 2011/0164855 | A1 | 7/2011 | Crockett et al. | |
| 2012/0170767 | A1 * | 7/2012 | Astrom et al. | 381/77 |

* cited by examiner

*Primary Examiner* — Joseph Saunders, Jr.
(74) *Attorney, Agent, or Firm* — Faegre Baker Daniels LLP

(57) ABSTRACT

A computing device may be configured to output a digital audio stream to an audio playback system for rendering as sound over speakers. The sound may be sampled. Based at least in part on a quality of the sampled sound, the data rate of the digital audio stream may be reduced by reducing a sampling rate and/or by reducing a number of bits per sample. A reduced sampling rate may be determined based on a computed maximum sampling rate of the audio playback system, and/or a reduced number of bits per sample may be determined based on a computed maximum number of bits per sample of the audio playback system. The maximum usable sampling rate and maximum usable number of bits per sample may be determined based on an upper usable frequency within a frequency spectrum of the sampled sound.

20 Claims, 3 Drawing Sheets

ADJUSTING A DATA RATE OF A DIGITAL AUDIO STREAM BASED ON DYNAMICALLY DETERMINED AUDIO PLAYBACK SYSTEM CAPABILITIES

FIELD OF TECHNOLOGY

The present disclosure pertains to audio playback systems and associated devices, and more specifically to adjusting a data rate of a digital audio stream based on dynamically determined audio playback system capabilities.

BACKGROUND

Audio playback systems, such as stereo receivers, Audio/Video (AV) receivers, portable stereos, amplified speaker systems, and the like, may receive an audio stream from any one of a number of audio sources and render the audio stream as sound over speakers. The audio stream may be an uncompressed digital audio stream, such as a Linear Pulse-Code Modulation (LPCM) encoded stream, or a compressed digital audio stream that has been created using either a lossless compression technology, such as the Free Lossless Audio Codec (FLAC), or a lossy compression technology, such as MPEG-1 or MPEG-2 Audio Layer III (MP3).

Rendering of audio at the audio playback system may entail processing the audio stream in various ways, e.g., to improve, enhance, or customize the sound that is generated by the audio playback system. This rendering may entail the use of a Digital Signal Processor (DSP), which may be an Application Specific Integrated Circuit (ASIC, i.e. a chip) that is hardwired within the audio playback system. For example, a DSP chip may provide alternative audio field simulations for generating different audio effects such as "hall," "arena," "opera" and the like, which simulate, e.g. using surround sound and echo effects, audio playback in different types of venues.

The nature of the audio rendering that is performed by the audio playback system may be predetermined and fixed, or may be user-selectable from only a finite number of predetermined alternatives. This may be due to limited or fixed audio processing capabilities of the ASIC DSP, or other components, that may be used at the audio playback system for rendering audio. Sound quality may vary depending upon the audio rendering that is performed, the physical attributes of the speakers over which the sound is played (e.g. size, number, configuration, wattage, etc.), and/or the physical characteristics of a room in which the sound is played (e.g. anechoic quality or amount of reverberation).

SUMMARY

In one aspect, there is provided a method of adjusting a data rate of a digital audio stream, the method comprising: sampling sound generated, from a digital audio stream, by an audio playback system; based at least in part on a quality of the sampled sound, reducing the data rate of the digital audio stream by performing either one or both of: reducing a sampling rate of the digital audio stream to a reduced sampling rate; and reducing a number of bits per sample of the digital audio stream to a reduced number of bits per sample.

In another aspect, there is provided a computing device configured for outputting a digital audio stream to an audio playback system for rendering as sound over speakers, the computing device comprising a processor, the processor operable to adjust a data rate of the digital audio stream by: sampling the sound generated, from the digital audio stream, by the audio playback system; and based at least in part on a quality of the sampled sound, reducing the data rate of the digital audio stream by performing either one or both of: reducing a sampling rate of the digital audio stream to a reduced sampling rate; and reducing a number of bits per sample of the digital audio stream to a reduced number of bits per sample.

In another aspect, there is provided a tangible machine-readable medium storing instructions that, upon execution by a processor of a computing device, the computing device configured to output a digital audio stream to an audio playback system for rendering as sound over speakers, cause the processor to: sample the sound generated, from the digital audio stream, by the audio playback system; and based at least in part on a quality of the sampled sound, reduce the data rate of the digital audio stream by performing either one or both of: reducing a sampling rate of the digital audio stream to a reduced sampling rate; and reducing a number of bits per sample of the digital audio stream to a reduced number of bits per sample.

BRIEF DESCRIPTION OF DRAWINGS

In the figures which illustrate example embodiments.

DETAILED DESCRIPTION

Figure 1:
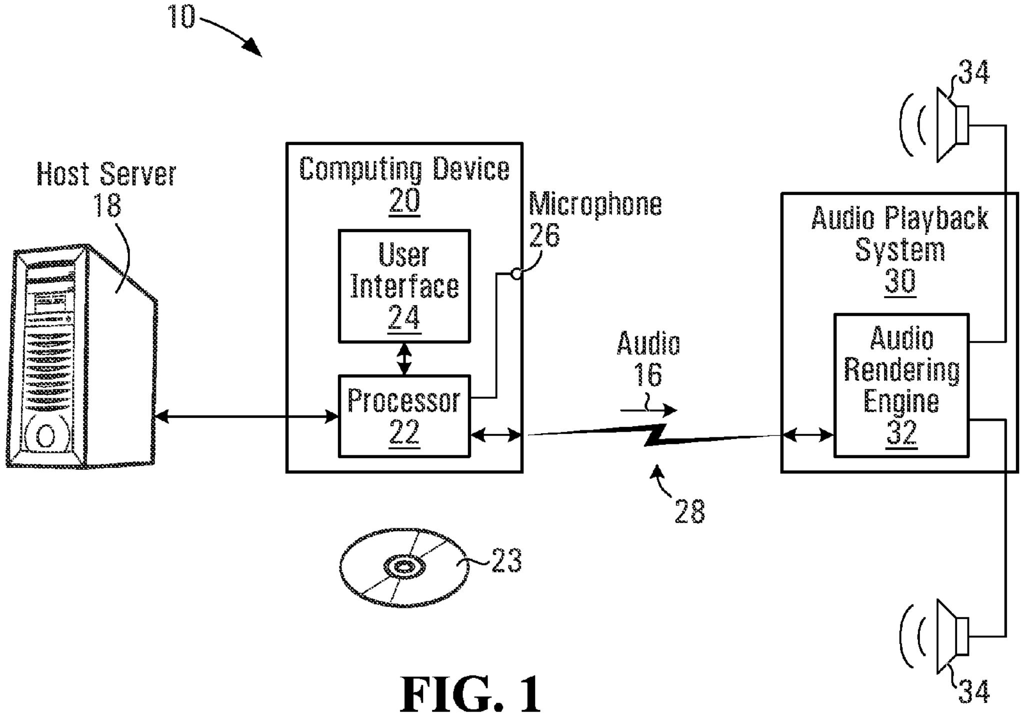
FIG. 1 is a block diagram illustrating an example system.

FIG. 1 illustrates an example system 10 comprising a computing device 20 and an audio playback system 30 interconnected by a communications link 28. The computing device 20 outputs a digital audio stream over communications link 28 to the audio playback system 30, which renders the digital audio stream as sound over speakers. The present disclosure describes an exemplary approach for adjusting, based on dynamically determined capabilities of the audio playback system 30, the data rate of the digital audio stream that, in at least some embodiments, may allow bandwidth to be conserved with little or no sound quality being lost.

Computing device 20 is an electronic computing device that is capable of outputting a digital audio stream over a communications link 28. The audio stream may be uncompressed or compressed and may be in one of a wide variety of formats. Examples of uncompressed audio formats include LPCM, Waveform Audio File (WAV), Audio Interchange File Format (AIFF), or AU. Examples of compressed audio formats generated using a lossless compression technology include FLAC, WavPack (.WV extension), True Audio (TTA), Adaptive Transform Acoustic Coding (ATRAC) Advanced Lossless, Apple® Lossless (.M4A extension), MPEG-4 Scalable to Lossless (SLS), MPEG-4 Audio Lossless Coding (ALS), MPEG-4 Direct Stream Transfer (DST), Windows Media Audio (WMA) Lossless), and Shorten (SHN). Examples of compressed audio formats generated using a lossy compression technology include MP3, Dolby™ Digital, Advanced Audio Coding (AAC), ATRAC and WMA Lossy. Other formats not expressly enumerated herein, or as yet unreleased, are also contemplated.

The computing device 20 may be one of a wide variety of different types of electronic devices, such as a desktop computer, PC, laptop, handheld computer, tablet, netbook, mobile device, smartphone, portable music player, video game console, or other type of computing device. As such, computing device 20 may either be a general purpose device (e.g. a general purpose computer) or a special purpose device (e.g. a music player). The computing device 20 comprises at least one processor 22 in communication with volatile and/or non-volatile memory and other components, most of which have been omitted from FIG. 1 for the sake of brevity. The processor 22 may be one of a number of different types of processors, such as a Central Processing Unit (CPU), Accelerated Processing Unit (APU), Graphics Processing Unit (GPU) or other type of processor. The processor 22 may be singular or multiple (e.g. a plurality of parallel processors working in unison). Omitted components of computing device 20 may include a network interface, which may be used if the communications link 28 comprises a network (e.g. a wireless or wired network).

The computing device 20 of FIG. 1 includes a user interface 24. The user interface 24 comprises a display and a user input mechanism, neither of which is expressly illustrated in FIG. 1. The display could be virtually any type of display, such as a Liquid Crystal Display (LCD), Light Emitting Diode (LED) display, Organic LED (OLED) display, Plasma display, Cathode Ray Tube (CRT), or others. The user input mechanism may also be of virtually any type, including but not limited to a keyboard, pointing device (e.g. mouse, trackball, trackpad or stylus), touchscreen, or voice-activated input mechanism. As will become apparent, the user interface 24 may optionally be used to control operation of the computing device 20 for adjusting the data rate of the digital audio stream output over communications link 28.

The example computing device 20 of FIG. 1 also has a microphone 26. The microphone 26 may be permanently mounted in the housing of the computing device 20 or may be removably interconnected to the computing device 20, e.g. by being plugged into an audio input jack (such as an RCA mini or 3.5 mm jack for example). The microphone 26 is used for the exemplary data rate adjustment described herein.

The operation of computing device 20 as described herein may be wholly or partly governed by software or firmware loaded from a non-transitory, tangible machine-readable medium 23, such as an optical storage device or magnetic storage medium for example. The medium 23 may store instructions executable by the processor 22 or otherwise governing the operation of computing device 20.

The digital audio stream that is output by the computing device 20 may be based on an audio stream received from an upstream host server 18. The term "upstream" is in relation to the general flow of an audio stream throughout the system 10, which is from computing device 20 to audio playback system 30. The host server 18 may for example may be a commercial server operated by an online digital media store (e.g. the iTunes™ Store), an internet service provider or other entity. Alternatively, the host server 18 may be another type of internet-based or wide area network based server, enterprise server, home network-based server or otherwise. These examples are for illustration only and are non-limiting. In some embodiments, the digital audio stream that is output by the computing device 20 may originate at the device 20, with no host server 18 being present.

Audio playback system 30 is an electronic device, such as a stereo receiver, AV receiver, portable stereo, amplified speaker system, or the like, that receives a digital audio stream 16 and renders it as sound over speakers 34. The audio playback system 30 of the present example is separate from the computing device 20, e.g. each device has its own power supply. This is not necessarily true of all embodiments. The separate computing device 20 is presumed to be within sampling range of the sound generated by audio playback system 30, e.g. the two may be situated in the same room. The audio playback system 30 uses an audio rendering engine 32 to render sound. In the present example, the audio rendering engine 32 is presumed to have a predetermined and finite set of audio rendering capabilities, possibly due to a hardwired DSP chip comprising the engine 32. Various other components of audio playback system 30, such as components used to facilitate receipt the digital audio stream 16 (e.g. a network interface) and generation of sound (e.g. an amplifier), are omitted from FIG. 1 for brevity.

The speakers 34 by which sound is generated may form an integral part of the audio playback system 30 (e.g. as in a portable stereo) or may be connected to the audio playback system 30, e.g. via speaker wire or wirelessly (as in the case of an AV receiver). In the latter case, the audio playback system 30 may have an attached or embedded Radio Frequency (RF) transmitter, and each speaker may have a complementary RF receiver. The number of speakers may vary between embodiments. For example, some audio playback system 30 may have five, six or seven speakers plus a subwoofer (referred to as a 5.1, 6.1 or 7.1 channel system).

Communications link 28 carries the digital audio stream 16 from the computer 20 to the audio playback system 30. The communications link 28 may be virtually any form of interconnection that is capable of carrying digital information, wirelessly or otherwise, including but not limited to a wired Local Area Network (LAN) connection (e.g. Ethernet connection), Wireless LAN (e.g. WiFi™) connection, WiGig™, High-Definition Multimedia Interface (HDMI) connection, wireless HDMI, Bluetooth, WiSA, timing synchronized Ethernet protocols such as 802.1AS, a power line connection carrying data over a conductor used for electrical power transmission, optical fiber, proprietary wireless connection (e.g. AirPlay®) or the like.

Figure 2:
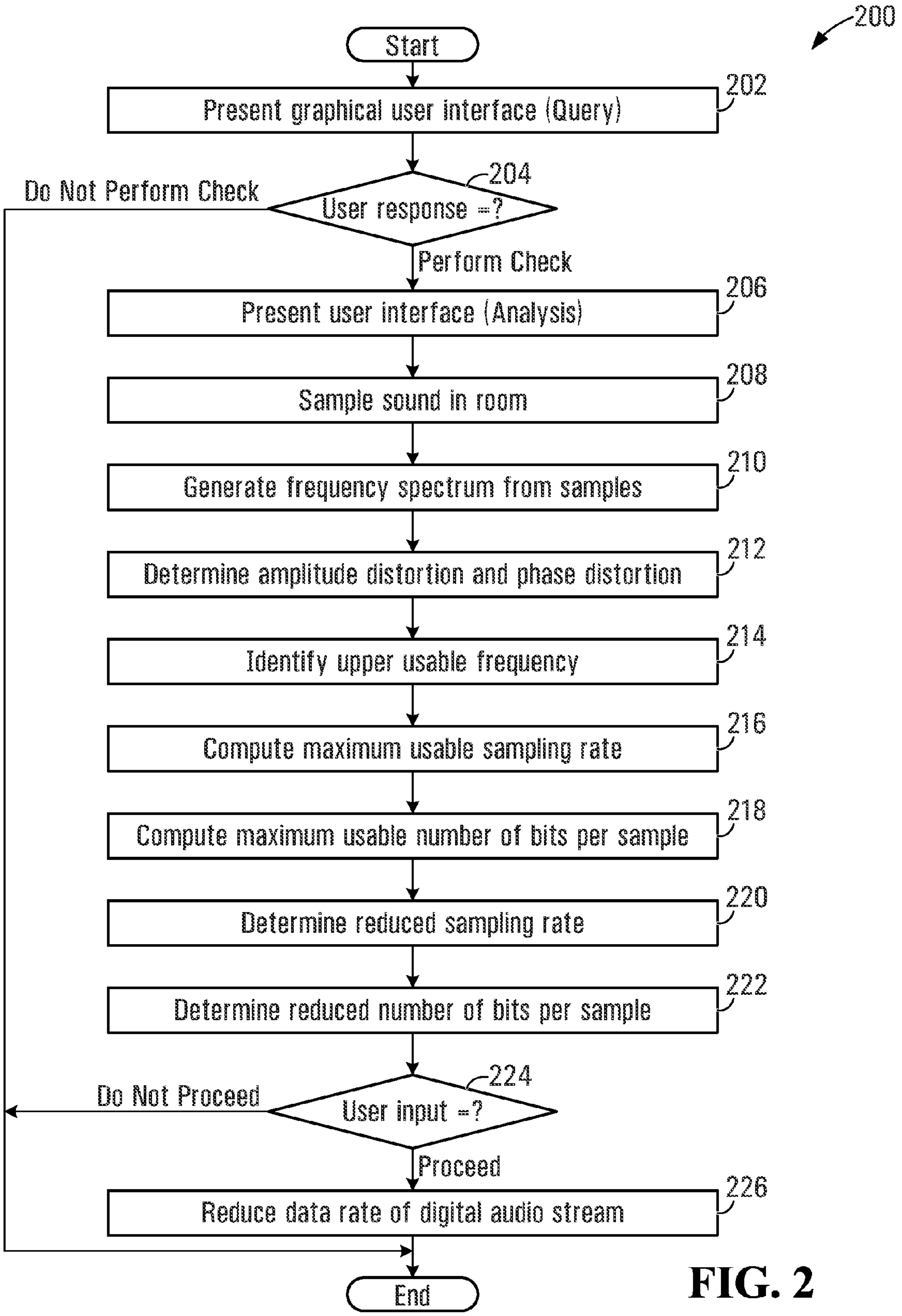
FIG. 2 contain a flow chart illustrating operation of a computing device in the system of FIG. 1.

Operation 200 of the computing device 20 for adjusting a data rate of a digital audio stream based on dynamically determined audio playback system capabilities is illustrated in FIG. 2. For the purpose of this example, it is presumed that the computing device 20 is initially outputting a digital audio stream 16 to audio playback system 30 that is either uncompressed or compressed using a lossless compression technique and that the audio playback system 30 is rendering the audio stream as sound. For illustration, the digital audio stream 16 being output by the computing device 20 is presumed to have a sampling rate of 48 KHz and a bit depth (i.e. bits/sample) of 24 bits/sample, together yielding an operative data rate of 1.152 megabits per second (Mbps). The audio stream specifications of other embodiments may differ.

Figure 3:
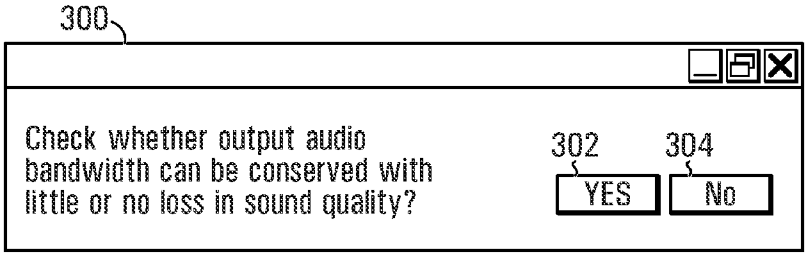
FIGS. 3 and 4 illustrate graphical user interfaces that may be presented by the computing device whose operation is illustrated in FIG. 2.

Initially, the computing device 20 presents a graphical user interface (GUI), such as GUI 300 of FIG. 3, on its display (FIG. 2, 202). The purpose of GUI 300 is to query the user as to whether data rate adjustment is desired. The GUI 300 presented at computing device 20 may present a query such as "Check whether output audio bandwidth can be conserved with little or no loss in sound quality?" to solicit input from a user. The term "bandwidth" in the foregoing text is a colloquial reference to data rate, which may be more a familiar term for a typical user. The example GUI 300 also includes GUI controls, such as buttons 302 and 304, for responding to the query in the affirmative or negative, respectively. The GUI 300 may be a dialog box, as illustrated in FIG. 3, or any other type of GUI. The GUI 300 may pop up or otherwise be displayed on any number of triggering conditions, e.g. when the computing device 20 commences outputting a digital audio stream, when a user-configurable settings page or interface is invoked, when a particular application or utility is launched, or otherwise.

If the user responds in the negative to the query of GUI 300 (FIG. 2, 204), operation terminates. However, if the user responds in the positive, indicating a desire to proceed with the check, then another GUI may be displayed (FIG. 2, 206) to present the analysis to the user. An example GUI 400 for this purpose is illustrated in FIG. 4.

Figure 4:
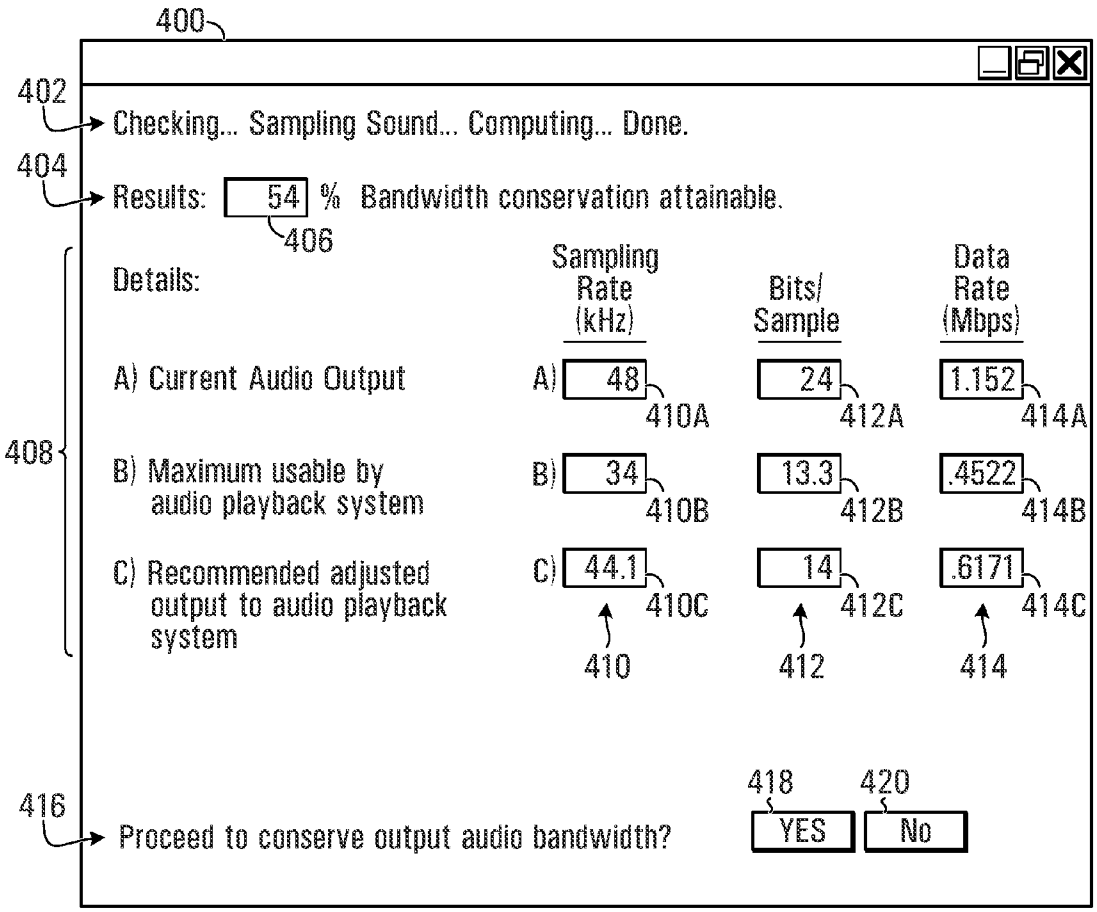

Referring to FIG. 4, GUI 400 is a dialog box including various fields and various GUI controls. A textual status field 402 is for apprising a user of the current status of the analysis. Field 402 may initially contain certain text and may be periodically updated with other text through the analysis. For example, the text in field 402 may initially be "Checking" but then may be supplemented, or replaced, with other text reflecting the ongoing analysis as it occurs, as described below.

A results field 404 provides information regarding the bandwidth conservation that is attainable, with the results being presented, e.g., as a percentage, in a text box 406. This value could alternatively be presented as a data rate value, e.g. in Mbps or Kbps units, via a graphical indicator (e.g. a bar graph), or in some other way. The text box 406 may initially be blank, pending completion of the analysis.

A details section 408 of GUI 400 provides more specific information regarding the analytical basis for the attainable results value presented in text box 406. The example details section 408 has three rows, labelled A), B), and C) respectively, and three columns 410, 412, and 414.

Row A) indicates the characteristics of the digital audio stream 16 prior to the commencement of the bandwidth conservation analysis, i.e. before any adjustment is performed. The values in text boxes 410A, 412A and 414A in columns 410, 412 and 414, respectively, represent the operative (pre-adjustment) sampling rate (48 KHz), operative bits/sample (24 bits/sample) and operative data rate (1.152 Mbps), respectively, of the example digital audio stream 16. It will be appreciated that the value in text box 414A is the product of the values in text box 410A and text box 412A. Row A) may be the only one of rows A)-C) that is populated prior to commencement of the analysis.

Row B) is intended to set forth the maximum usable sampling rate, maximum usable bits/sample and resultant maximum usable data rate of the audio playback system 30. The values represent an upper threshold of digital audio stream characteristics that, if exceeded, would not result in any appreciable or significant improvement in sound quality of the sound being rendered by the audio playback system 30 and played as sound. The threshold may be due to: limitations in the audio rendering components (e.g. DSP) that are being used; limitations in the speakers through which sound is being generated by the audio playback system 30; and/or physical characteristics of a room in which the sound is being played (e.g. anechoic quality or amount of reverberation). The three text boxes 410B, 412B, and 414B are initially empty and will be populated automatically based on the outcome of sound quality sampling of the audio playback system 30 that the computing device 20 will conduct during its bandwidth conservation analysis. The value in text box 414B will be the product of the values in text boxes 410B and 412B.

Row C) is will be used to set forth a recommended sampling rate, recommended number of bits/sample and resultant data rate to which the computing device 20 could reduce the digital audio stream 16 without any significant, noticeable, or possibly even any, reduction in sound quality. As will become apparent, the values in this row are based on the values in row B), but have been rounded to the closest standard values or closeby standard values. The term "standard values" includes values dictated by standards bodies or industry groups, or de facto industry standards. Depending on the embodiment, the values in row C) may be standard values that are closest to and greater than the corresponding row B) values, or closest to and less than the corresponding row B) values. The strategy that is used (i.e. greater than versus less then) in any particular embodiment may be based on which of the two competing interests of preserving sound quality and maximizing bandwidth conservation is more important in that embodiment, as will be described. The three text boxes 410C, 412C, and 414C are initially empty. The value in text box 414C will be the product of the values in text boxes 410C and 412C.

The GUI 400 also includes a field 416 for soliciting user input as to whether any attainable bandwidth conservation as represented in text box 406 should indeed be effected. The field includes GUI controls 418 and 420 (e.g. buttons) for indicating that adjustment should proceed or should not proceed, respectively.

In alternative embodiments, the GUI 400 may be something other than a dialog box or may comprise multiple UI pages or screens.

At the conclusion of operation 206 of FIG. 2, the GUI 400 will be displayed. In the present example, only the text "Checking . . . " will initially appear within in field 402. Text boxes 410A, 412A and 414A will have been populated with the initial, operative data rate information of the digital audio stream 16. All other text boxes will initially be blank.

Thereafter, the computing device 20 uses microphone 26 (FIG. 1) to sample the sound being generated by the audio playback system 30 (FIG. 2, 208). In some embodiments, the computing device 20 may insert, into the digital audio stream transmitted over communications link 28, audio data representing a particular, predetermined ("canned") sound, e.g. an impulse sound such as a chirp or sweep (whose frequency characteristics are known), to cause the audio playback system 30 to play that sound for sampling purposes. The reason is that known characteristics of that sound can be compared to whatever sound is actually generated (as sampled) in order to ascertain the quality of the generated sound.

In some embodiments, it may not be required to insert a predetermined chirp or sweep sound into the audio stream during operation 200. Rather, it may be possible to use or manipulate the existing digital audio stream 16 for sampling purposes. This approach may entail a somewhat different, more involved analysis than that which would be undertaken for a predetermined sound.

Briefly, a short-time Fourier transform analysis (or equivalent) could be repeatedly performed on the digital audio stream and the sound generated by audio playback system 30 sampled by way of the microphone 26. A measured time delay could be applied to enable the detected sound samples to be compared with the appropriate corresponding source samples. The source and received spectra could be monitored repeatedly or continuously until signals above a threshold (e.g., 90 dbSPL) from all frequency bins comprising the frequency spectrum, in the measureable frequency range of the microphone 26, have been sampled. The threshold may be uniform for all frequency bins or may have differing values for different frequency bins. These sampled results would then be used for the analysis in place of the chirp. The length of time needed for arriving at a usable result by way of such an "accumulation approach" may depend on the spectral richness and/or variety of the source content of the digital audio stream 16.

Regardless of whether a predetermined sound is used or whether the source digital audio stream 16 is used, a time delay between the output of the digital audio stream 16 by the computing device 20 and the detection of the corresponding played sound at the microphone 26 is measured. Time delay can be measured by sending out a ping and measuring the signal delay back to the microphone 26, or by matching the envelope of the digital audio stream 16 to that of the received signal (e.g., by scanning a set of samples of the source signal and then searching the received signal, which may be stored in a buffer, for a set of samples that has a high signal correlation). Thereafter, time shift may be computed based on the known sampling rate.

The sampling in operation 208 will yield a plurality of time-domain samples, which may be stored in memory at the computing device 20. The samples may be in LPCM format or in another format. The sampling rate may be chosen such that the Nyquist frequency is greater than the audio bandwidth for which screening is being performed, which audio bandwidth may be dictated, at least in part, by the sampling equipment (e.g. microphone 26) that is being used. The number of bits per sample may be set to relatively high level, e.g., 18 to 24 bits per sample, in relation to common industry standard bit depths, for the sake of accuracy. The text field 402 (FIG. 4) may be updated or supplemented with a status message such as "Sampling sound . . . " to reflect operation 208.

Thereafter, the time-domain samples are transformed to the frequency domain, e.g. using a fast Fourier transform (FIG. 2, 210). For example, a high-resolution FFT (e.g., 16384 points or more) may be used for the sake of accuracy. The result will be a frequency spectrum of the sampled sound comprising a plurality of frequency components in a like plurality of frequency bins and will include amplitude and phase information regarding each of the frequency components. The amplitude information may comprise an amplitude spectrum, i.e. an amplitude value for each frequency component in the frequency spectrum. The phase information may comprise a phase spectrum, or a set of numbers showing the relative time shift of each of the different frequency components. Other representations could be used in alternative embodiments. At this stage, the text in text field 402 of GUI 400 (FIG. 4) may be replaced with, or may be updated to read, "Computing . . . " to reflect the status of the analysis.

Using the amplitude and phase information obtained in operation 210, the computing device 20 determines amplitude distortion and phase distortion of the sampled sound, e.g. by determining amplitude distortion and phase distortion for the frequency components of the frequency spectrum (FIG. 2, 212). It is presumed that the time delay has already been measured, e.g. using one of the two methods described above in conjunction with operation 208, to allow time-matching of the frequency spectrum as sampled (representing time-delayed sound) with the corresponding portion of the digital audio stream 16. Each bin of the frequency and phase spectra of the source audio stream (e.g., chirp or sweep) is then compared with the corresponding bin of time-matched counterpart to compute the error for each frequency bin. The amplitude and phase information, or the associated amplitude and phase distortion, may be considered to constitute or indicate a quality of the sampled sound.

To perform this analysis, first the broadband amplitude (or signal level) of the sampled frequency spectrum may be averaged and normalized against the broadband amplitude spectrum of the source signal. The spectral bins of the lower-level signal may be multiplied or scaled by a single scaling factor computed from the relative average signal (e.g., using root-mean-squared (RMS) calculations for each signal and taking the ratio) to match its overall level to that of the higher signal. Next, for each frequency bin, the measured amplitude of the normalized, received signal may be subtracted from that of the source signal. Then the absolute value of the difference may be taken, and the result divided by the amplitude of the source signal. This will yield the error for one amplitude bin of the amplitude spectrum. The same calculation may be performed on the phase bin of the phase spectrum. The spectral error on a per-bin basis may thus be obtained. This may be considered as a spectral (per-frequency bin) measurement of the amplitude and phase distortion. The resulting function of the computed error for all of the bins taken as a whole may be referred to as an error distribution.

Based on the amplitude distortion and phase distortion determined in operation 212, the computing device 20 may then identify, within the frequency spectrum, a frequency, referred to as the upper usable frequency, above which each of the amplitude distortion and phase distortion exceed a predetermined distortion limit (FIG. 2, 214). The amplitude distortion limit may be separate, and may differ, from the phase distortion limit. In addition, in some embodiments, the predetermined distortion limits for amplitude and phase may vary at different frequency bins. Put another way, the predetermined amplitude distortion limit and/or the predetermined phase limit may be frequency component-specific or frequency bin-specific. That is, each component or bin may have an applicable amplitude distortion limit and/or and applicable phase limit that may differ from the amplitude distortion limit and/or phase distortion limit that is applicable to other bins or components. A subset of the frequency components of the frequency spectrum that are at or below the upper usable frequency, i.e. wherein each frequency component of the subset is less than or equal to said upper usable frequency, may be referred to as the usable frequency range. The usable frequency range is a range of frequencies within the error distribution (which will be below the Nyquist frequency of the digital sampling apparatus used to obtain the measurement) for which the per-frequency bin amplitude error and phase spectral error (as computed above) do not exceed predetermined error or distortion thresholds.

In one embodiment, the usable frequency range may be found by searching the error distribution starting from the lowest frequency, verifying that the first frequency bin falls within the error thresholds for amplitude and phase (i.e. below the applicable amplitude distortion threshold and below the applicable phase distortion threshold), and then searching upwards, bin by bin, until a first frequency bin falling outside the error thresholds (i.e. for which amplitude distortion exceeds the applicable amplitude distortion threshold and/or for which phase distortion exceeds the applicable phase distortion threshold) is found.

The usable frequency range represents the portion of the frequency spectrum, composed of frequency components of the spectrum which are at or below the upper usable frequency, that is usable by the audio playback system 30. In other words, the frequencies within that range are the frequencies whose rendering by the audio playback system 30, within the physical environment of the room in which the sound is being played, should result in acceptable amplitude and/or phase distortion in the generated sound.

In some embodiments, determination of the upper usable frequency may involve performing a digital room compensation analysis, e.g. generating Finite Impulse Response (FIR) correction filters for reversing room effects and linear distortion in the speakers. Techniques for performing digital room compensation analysis are known in the relevant art.

Once the upper usable frequency is known, a maximum usable sampling rate of the audio playback system is computed (FIG. 2, 216). The maximum usable sampling rate is a sampling rate threshold above which any increase in sampling rate of the digital audio stream provided to the audio playback system 30 would not improve the sound quality of the sound generated by the audio playback system 30. This may be due to limited capabilities of the audio playback system 30 and/or room characteristics. In the present embodiment, the maximum usable sampling rate is computed by using the identified upper frequency limit of the usable frequency range as a Nyquist frequency. Thus the maximum usable sampling rate may be determined by doubling the upper usable frequency. For example, if the upper frequency limit were 17 KHz, the maximum usable sampling rate would be 34 KHz (samples/sec). The latter value may be populated into text box 412A of GUI 400.

Thereafter, the maximum usable number of bits/sample, also referred to as the maximum usable bit depth, is computed (FIG. 2, 218). The maximum usable bit depth is the largest bit depth usable by the audio playback system, above which added bits would not significantly or appreciably contribute to sound quality. To compute the maximum usable bit depth, a total harmonic distortion and noise (THD+N) of the usable frequency range may initially be measured. This measurement is taken with respect to the usable frequency range, rather than the entire frequency spectrum, because the frequencies above the maximum usable frequency may, by necessity (to avoid aliasing), be low-pass filtered before the digital audio stream 16 is sample-rate converted to the lower sampling rate. As such, those frequencies may be considered irrelevant.

In one example, if the original source signal has 24 bits of resolution, the maximum dynamic range will be 144 dB. The THD+N measurement might be, say, −80 dB. To compute the maximum usable number of bits per sample for this value, the THD+N measurement may be divided by a conversion factor of 6 decibels per bit, or an approximation thereof (e.g. 80 db/6 db per bit=13.3 bits/sample). This value may be populated into text box 412B of GUI 400.

Based on the computed maximum usable number of bits/sample and maximum usable sampling rate, the maximum usable audio data rate can be determined simply by multiplying the two together (e.g. 34K samples/second*13.3 bits/sample=452.2 Kilobits per second). This value may be populated into text box 412C of GUI 400.

At this stage, the maximum usable sampling rate computed in operation 216 and the maximum usable bit depth computed in operation 218 may be used to determine a reduced sampling rate and a reduced bit depth, respectively, to which the digital audio stream 16 should be adjusted or, more specifically to the present embodiment, to which the computing device 20 will recommend, in row C) of GUI 400, that the digital audio stream 16 be adjusted contingent on user approval to proceed (FIGS. 2, 220 and 222).

The strategy employed for determining the recommended reduced values for the sampling rate and the bit depth may be consistent as between the two. For example, the "maximum usable" values for both parameters (i.e. for both sampling rate and the bit depth) may either be rounded up to the closest respective standard values, or they may both be rounded down to the closest respective standard values.

The rationale for adjusting the "maximum usable" values to standard values, in contrast to using the maximum usable values as such for example, is to promote compatibility with existing standards-compliant systems or technologies. Standard values may be dictated by one or more standards bodies or may be de facto industry standards. For example, in the case of sampling rates, standard values may include 8 KHz, 11.025 KHz, 16 KHz, 22.05 KHz, 32 KHz, 44.1 KHz, 47.25 KHz, 48 KHz, 50 KHz, 50.4 KHz, 88.2 KHz, 96 KHz, 176.4 KHz, 192 KHz, 352.8 KHz, 2.8224 MHz and 5.6448 MHz. In the case of bit depth, standard values may include 12, 14, 16, 18, 20 or 24 bits per sample. These examples are not intended to be exhaustive or limiting and may change as standards evolve.

The decision of whether to round the sampling rate and bit depth parameters up or down may be based on the requirements of a particular embodiment and/or user preference. A GUI control (not expressly shown) may permit entry of user input indicating whether rounding should be up or down.

For example, a decision to round the parameters up from their respective computed maximum usable values may be motivated by a desire to preserve the pre-adjustment quality of the sound being generated by the audio playback system 30 despite the reduction in the sampling rate and/or bit depth from their original values. This decision should have the effect of preserving sound quality because both of the parameters will still exceed their respective computed maximum usable values. In other words, the audio playback system 30 will still generate the best sound that it is capable of generating (at least as that sound has been sampled at the computing device 20) despite the reduction in the sampling rate and/or bit depth from pre-adjustment values. A trade-off is that some portion of the audio information in the digital audio stream 16, however small it may be, may effectively be "wasted" at the audio playback system 30, in that it will not contribute to an improvement in sound quality over that which would result from the maximum usable values.

Conversely, a decision to round the maximum usable sampling rate and/or maximum usable bit depth down may be motivated by a desired to avoid the "waste" problem mentioned above, since all of the audio information in the digital audio stream 16 that is being rendered will contribute to the sound quality of the sound being generated at the audio playback system 30 in that case. It should be appreciated that this may come at the expense of a somewhat degraded sound quality. That is, the audio playback system 30 will no longer be able to generate the best sound quality that it is capable of generating (as qualified above). The reason is that the reduction in sampling rate and/or bit depth, to levels that are below the respective computed maximum usable values, will have robbed the audio playback system 30 of some of the audio information necessary to achieve that "best" sound quality.

Whichever direction of rounding is chosen (or operative by default, as may be the case for some embodiments), the reduced sampling rate is determined and automatically populated into text box 410C, and the reduced bit depth is determined and automatically populated into text box 412C. For example, if the direction of rounding is up, the value of 34 KHz from text box 410B might be rounded up to a standard value of 44.1 KHz, and the value of 13.3 bits/sample from text box 412B might be rounded up to a standard value of 14 bits/sample. The reduced data rate could thus be determined simply by multiplying the two together: 44.1 K samples/second*14 bits/sample=617.1 Kilobits per second). The latter value may be automatically populated into text box 414C of GUI 400. This value may be used to determine a percentage that can be automatically populated into text box 406B. For example, presuming an original data rate of 1.152 MHz, the proposed reduced value of 617.1 Kbps would represent a bandwidth conservation of approximately 54%.

Alternatively, if the direction of rounding were down, the value of 34 KHz from text box 410B might be rounded down to a standard value of 32 KHz, and the value of 13.3 bits/sample from text box 412B might be rounded down to a standard value of 12 bits/sample. The reduced data rate can be determined simply by multiplying the two together: 32 K samples/second*12 bits/sample=384 Kbps), which would represent a bandwidth conservation of only approximately 33%.

Thus, when the direction of rounding of a particular embodiment is disregarded, it may be considered generally that the reduced sampling rate is a standard sampling rate selected based on closeness to the computed maximum sampling rate, and that the reduced number of bits per sample is a standard number of bits per sample selected based on closeness to the computed maximum number of bits per sample.

With the GUI 400 now being fully populated, the text "Done" may be added to, or may replace, the existing text within text field 402 to reflect the fact that the analysis is complete. At this stage, the user may elect not to proceed with the adjustment by selecting GUI control 420 (FIG. 2, operation 224), in which case operation 200 terminates. Alternatively, the user may elect to proceed with the adjustment by selecting GUI control 418, in which case the recommended adjustments of row C) may be effected (FIG. 2, operation 226).

To effect the adjustment, the digital audio stream 16 may be format converted by the computing device 20 using any one of a number of format conversion techniques. In the case of LPCM, the sampling rate may be adjusted downwardly by applying a sample-rate conversion algorithm. The bit depth may be reduced by adding dithering at the reduced bit width and then truncating to the reduced bit width. In the case of a compression algorithm, the source (or decoded) LPCM may be re-encoded using a bit rate supported by the compression algorithm that is closest to text box 412C of GUI 400.

The foregoing description provides an illustration of how to perform an adjustment to a data rate of a digital audio stream 16 that is uncompressed or that is compressed utilizing a lossless compression format. If the digital audio stream 16 had been compressed using a lossy compression format, then the above-described approach may be complicated by the fact that the compression performed by computing device 20 may itself result in amplitude and/or phase distortion in the ultimately rendered sound. This may result simply from the fact that certain audio information lost in compression will not be communicated to the audio playback system 30 as part of the digital audio stream 16. Thus it may not be possible to determine, by sampling alone, what distortion has been introduced specifically by the audio playback system 30 and/or room environment.

In some embodiments in which the digital audio stream 16 output by the computing device 20 actually originates from an upstream host server 18, the adjustment in data rate may be applied at the host server 18 rather than the computing device 20. For example, once the computing device 20 has presented GUI 400 and the user has indicated a desired to proceed with the adjustment, the adjusted sampling rate and bits/sample values may be communicated to the host server 18. The host server 18 may then effect the data rate reduction upstream of the computing device 20. This may have a benefit of freeing bandwidth in a communication link between the host server 18 and the computing device 20. For example, network audio players such as Adobe™ Flash may support various quality levels. By default, the highest quality level at which no stuttering or dropout occurs may be selected. By using the above approach, the network audio player may be instructed to reduce its quality level based on the recommended reduced sampling rate and/or recommended reduced number of bits/sample.

Put another way, a computing device configured to output a digital audio stream to a separate audio playback system for rendering as sound over speakers may cause a data rate of the transmitted digital audio stream to be reduced, not by implementing the data rate adjustment locally, but by computing a recommended data rate reduction and communicating that information to an upstream host server 18 for implementation. This may be possible when the digital audio stream output by the computing device is based on an audio stream received from the upstream host server. A communication may be send by the computing device 20, to the host server 18, for causing the host server to reduce a data rate of the audio stream. The communication may include or reference the maximum sampling rate and/or the maximum usable number of bits per sample that has been computed by the computing device. The host server 18 may either reduce a sampling rate of the audio stream to a reduced sampling rate based on the communicated or referenced maximum sampling rate, or reduce a number of bits per sample of the audio stream to a reduced number of bits per sample based on the maximum usable number of bits per sample communicated or referenced by the computing device, or both. The same sorts of rounding (up or down) may be performed at the host server 18 as are described above as being performed at the computing device 20.

As illustrated by the foregoing, adjustment of a data rate of a digital audio stream can generally be performed by sampling sound generated, from the digital audio stream, by an audio playback system and, based at least in part on a quality of the sampled sound (e.g. based on a degree of distortion detected within the sampled sound, the distortion possibly being indicative of limited audio playback system capabilities), reducing a sampling rate of the digital audio stream and/or reducing a number of bits per sample of the digital audio stream. The degree of reduction in the sampling rate or number of bits per sample be based, at least in part, upon a degree of distortion detected in the sound (e.g. the higher the distortion, the greater the reduction in data rate, generally speaking).

As will be appreciated by those skilled in the art, various modifications can be made to the above-described embodiment. For example, some embodiments may lack either or both of GUI 300 and GUI 400. This may be the case when the computing device 20 lacks a user interface 24. In such cases, operation 200 of FIG. 2 may commence with operation 208, proceed to 214, skip 216 and 218, and end with operation 220. In that case, operation 200 may be executed automatically ("in the background"), possibly without any awareness on the part of a user, e.g. whenever the computing device 20 commences outputting a digital audio stream 16, whenever the computing device 20 is preparing to output other, perhaps higher priority, data over the same communications link 28 that is being used to carry the digital audio stream 16 and wishes to avoid exceeding the capacity of the link 28 or overutilizing the link 28, at periodic intervals, or at some other logical time(s). If a predetermined (e.g. sweep) signal is being used for sampling, then activation of that signal by the user may be desired, e.g. by way of user input such as a hardware button press, because automatic insertion of such a signal may be considered obtrusive by a user. If the background accumulation approach (described above) is used, the operation could be performed while digital audio streams are being played. Once a recommended data rate has been obtained, it could be stored and applied when a new stream is started.

The above embodiment describes use of an FFT in operation 210 of FIG. 2 for performing the transformation of samples from the time domain to the frequency domain. The FFT is a mathematical optimization of the Discrete Fourier Transform (DFT), which could alternatively be used. Other alternatives for performing this transformation, such as the Modified Discrete Cosine Transform (MDCT), short-time Fourier transform, and discrete wavelet transform, could be used in some embodiments. The latter three alternatives may be more suitable than the FFT when it is desired that the analysis be localized in time as well as frequency, which may be the case when the signal is time-varying.

In the above embodiment, operation 200 is described as possibly being triggered by a triggering condition, such as upon the outputting of a digital audio stream by computing device 20. In some embodiments, it is possible that the same, or a different, triggering condition may occur subsequent to completion of operation 200. For example, the subsequent triggering condition may be the outputting of another different digital audio stream by computing device 20, e.g. by a different software application than that which was responsible for outputting the first digital audio stream 16, or some other triggering condition.

When such a subsequent triggering condition occurs, it may be possible to avoid repeating certain steps of the originally executed operation 200 when adjusting the data rate of the digital audio stream 16 to a reduced rate. For example, if it is determined, or presumed, that the setup of the audio playback system 30 and room environment is unchanged from when operation 200 was first performed, i.e. that nothing has changed that could alter the results as presented in row B), then operation 200 of FIG. 2 could skip over operations 208-218. The GUI 400 could be presented with row A) populated with values based on the new digital audio stream 16 and row B) populated with the same values as before. Upon execution of operations 220 and 222 for the current digital audio stream 16, row C) can be populated with new values. Subsequent operation (224 and onward) may proceed as before. Alternatively, earlier user input might have been obtained (not expressly shown) to indicate that the data rate adjustment should be automatically performed for all digital audio streams after the first adjustment is performed. In that case, it may be possible to avoid presenting a GUI and just perform operations 220, 222 and 226 to perform the adjustment, either without user awareness or with an indicator being displayed to show that the adjustment has been performed and to indicate the percentage or amount of the bandwidth conservation. Such automatic adjustment might also occur by default when the computing device 20 lacks a UI.

In some embodiments, a smoothing or other filtering function may optionally be applied to the error distribution before searching the distribution to identify the usable frequency range.

In some embodiments, it may be possible to reduce the data rate of the digital audio stream even lower than the value shown in text box 414C. This may be performed by applying compression to achieve a lesser data rate, possibly with little or no reduction in perceived sound quality beyond that which would otherwise result from operation 200 of FIG. 2. For example, the values in text boxes 414A and 414B (or, in some embodiments, 414C) of FIG. 4 may be used as input to one or more lookup tables, or similar data structure(s), stored in memory at computing device 20. The lookup table(s) may be for mapping a recommended reduced sampling rate and/or bit depth, which are in respect of an uncompressed audio stream or an audio stream compressed using lossless compression, to a compressed data stream having a lesser data rate but possibly not having significant or noticeable loss in perceived sound quality. The data structure(s) could be predetermined and may not be tailored specifically for the computing device 20 or audio playback system 30.

For example, methods such as ABX perceptual comparison testing may be used to generate an empirical look-up table of uncompressed (e.g. LPCM) sampling rates and bit depths that are perceptually equivalent to bit rates of supported lossy compression algorithms. Such a table could be stored at the computing device 20, e.g., using a ROM. For example, such table might rank an MP3-encoded stream with 64 kbps data rate as equivalent, or effectively equivalent, in perceptual quality to a 24 kHz, 14 bit stereo LPCM stream. Similar rankings or equivalents could be stored in the lookup table for a number of supported bit rates of a number of supported lossy compression schemes. For example, the table-lookup could be performed after step 222 to find the nearest lossy compression algorithm having an equivalent sampling rate and/or bit depth greater than or equal to the results from operations 216 and/or 218. Once that lossy compression algorithm has been found, it may be applied to uncompressed audio at computing device 20, and the resulting compressed audio may be transmitted to the audio playback system 30 over communications link 28. This example presumes that the computing device 20 is itself able to apply the relevant compression. In some embodiments, the GUI 400, or another GUI, could include a control for selectively applying such a further data rate reduction, i.e. a GUI control for selectively applying a lossy compression algorithm to an uncompressed audio stream whose data rate has already been reduced, in order to further lessen the data rate of the audio stream without significant or perceptible sound quality reduction.

It will be appreciated that the various GUI fields and/or GUI controls illustrated or described herein, e.g. in FIG. 3 or 4, may be displayed independently from one another.

Other modifications will be apparent to those skilled in the art and, therefore, the invention is defined in the claims.

The following clauses provide a further description of example apparatuses, methods and/or machine-readable media.

1. A method of adjusting a data rate of a digital audio stream, the method comprising: sampling sound generated, from a digital audio stream, by an audio playback system; identifying a frequency above which amplitude distortion of the sampled sound exceeds a predetermined amplitude distortion limit and phase distortion of the sampled sound exceeds a predetermined phase distortion limit, the identified frequency being referred to as an upper usable frequency; computing, based on the upper usable frequency, a maximum usable sampling rate of the audio playback system; computing, based on a portion of a frequency spectrum of the sampled sound at or below the upper usable frequency, a maximum usable number of bits per sample of the audio playback system; and reducing the data rate of the digital audio stream by performing either one or both of: reducing a sampling rate of the digital audio stream to a reduced sampling rate that is determined on the basis of the computed maximum sampling rate; and reducing a number of bits per sample of the digital audio stream to a reduced number of bits per sample that is determined on the basis of on the computed maximum number of bits per sample.

2. The method of clause 1 wherein the determining of the upper usable frequency comprises: transforming the sampled sound from a time domain to a frequency domain, the transforming resulting in the frequency spectrum of the sampled sound, the frequency spectrum comprising a frequency component in each of a plurality of frequency bins, the transforming yielding amplitude information and phase information regarding each of the frequency components; and using the amplitude and phase information regarding each of the frequency components, determining, for each of the frequency components of the frequency spectrum, an amplitude distortion and a phase distortion.

3. The method of clause 1 wherein the computing of the maximum usable sampling rate comprises setting the maximum usable sampling rate to twice the upper usable frequency.

4. The method of clause 1 wherein the computing of a maximum usable number of bits per sample of the audio playback system comprises: measuring a total harmonic distortion and noise (THD+N) of the portion of the spectrum at or below the upper usable frequency; and converting the THD+N measurement to the maximum usable number of bits per sample.

5. The method of clause 1 further comprising determining the reduced sampling rate of the digital audio stream by rounding the maximum usable sampling rate of the audio playback system down to the closest standard sampling rate.

6. The method of clause 1 further comprising determining the reduced sampling rate of the digital audio stream by rounding the maximum usable sampling rate up to the closest standard sampling rate.

7. The method of clause 1 further comprising determining the reduced number of bits per sample of the digital audio stream by rounding the maximum usable number of bits per sample down to the closest standard number of bits per sample.

8. The method of clause 1 further comprising determining the reduced number of bits per sample of the digital audio stream by rounding the maximum usable number of bits per sample up to the closest standard number of bits per sample.

9. The method of clause 1 wherein the identifying of the upper usable frequency comprises computing a Finite Impulse Response (FIR) filter suitable for correcting distortion resulting from either one or both of characteristics of the speakers and characteristics of a physical space in which the sound is being generated by the speakers.

10. The method of clause 1 wherein the digital audio stream comprises uncompressed audio data or audio data that has been compressed using a lossless compression format.

11. A computing device configured for outputting a digital audio stream to an audio playback system for rendering as sound over speakers, the computing device comprising a processor, the processor operable to adjust a data rate of the digital audio stream by: sampling the sound generated, from the digital audio stream, by the audio playback system; identifying a frequency above which amplitude distortion of the sampled sound exceeds a predetermined amplitude distortion limit and phase distortion of the sampled sound exceeds a predetermined phase distortion limit, the identified frequency being referred to as an upper usable frequency; computing, based on the upper usable frequency, a maximum usable sampling rate of the audio playback system; computing, based on a portion of a frequency spectrum of the sampled sound at or below the upper usable frequency, a maximum usable number of bits per sample of the audio playback system; and reducing the data rate of the digital audio stream by performing either one or both of: reducing a sampling rate of the digital audio stream to a reduced sampling rate that is determined on the basis of the computed maximum sampling rate; and reducing a number of bits per sample of the digital audio stream to a reduced number of bits per sample that is determined on the basis of on the computed maximum number of bits per sample.

12. The computing device of clause 11 wherein the processor is further operable to determine the reduced sampling rate of the digital audio stream by rounding the maximum usable sampling rate of the audio playback system down to the closest standard sampling rate.

13. The computing device of clause 11 wherein the processor is further operable to determine the reduced sampling rate of the digital audio stream by rounding the maximum usable sampling rate up to the closest standard sampling rate.

14. The computing device of clause 11 wherein the processor is further operable to determine the reduced number of bits per sample of the digital audio stream by rounding the maximum usable number of bits per sample down to the closest standard number of bits per sample.

15. The computing device of clause 11 wherein the processor is further operable to determine the reduced number of bits per sample of the digital audio stream by rounding the maximum usable number of bits per sample up to the closest standard number of bits per sample.

16. A tangible machine-readable medium storing instructions that, upon execution by a processor of a computing device, the computing device configured to output a digital audio stream to an audio playback system for rendering as sound over speakers, cause the processor to: sample the sound generated, from the digital audio stream, by the audio playback system; identify a frequency above which amplitude distortion of the sampled sound exceeds a predetermined amplitude distortion limit and phase distortion of the sampled sound exceeds a predetermined phase distortion limit, the identified frequency being referred to as an upper usable frequency; compute, based on the upper usable frequency, a maximum usable sampling rate of the audio playback system; compute, based on a portion of a frequency spectrum of the sampled sound at or below the upper usable frequency, a maximum usable number of bits per sample of the audio playback system; and reduce the data rate of the digital audio stream by performing either one or both of: reducing a sampling rate of the digital audio stream to a reduced sampling rate that is determined on the basis of the computed maximum sampling rate; and reducing a number of bits per sample of the digital audio stream to a reduced number of bits per sample that is determined on the basis of on the computed maximum number of bits per sample.

17. The machine-readable medium of clause 15 wherein the instructions further cause the processor to determine the reduced sampling rate of the digital audio stream by rounding the maximum usable sampling rate of the audio playback system either down to the closest standard sampling rate or up to the closest standard sampling rate.

18. The machine-readable medium of clause 15 wherein the processor wherein the instructions further cause the processor to determine the reduced number of bits per sample of the digital audio stream by rounding the maximum usable number of bits per sample either down to the closest standard number of bits per sample or up to the closest standard number of bits per sample.

19. The tangible machine-readable medium of clause 16 wherein the instructions further cause the processor to: display, at the computing device, a graphical user interface (GUI) comprising at least one of: an indication of the computed maximum usable sampling rate of the audio playback system; and an indication of the computed maximum usable number of bits per sample of the audio playback system.

20. The tangible machine-readable medium of clause 16 wherein the instructions further cause the processor to: display, at the computing device, a graphical user interface (GUI) comprising at least one of: an indication of the reduced sampling rate that has been determined on the basis of the computed maximum usable sampling rate of the audio playback system; and an indication of the reduced number of bits per sample that has been determined on the basis of the computed maximum usable number of bits per sample of the audio playback system.

What is claimed is:

1. A method of adjusting a data rate of a digital audio stream, the method comprising:

sampling sound generated, from a digital audio stream, by an audio playback system;

ascertaining, from the sampled sound, a sound quality of the generated sound; and based at least in part on the ascertained sound quality of the generated sound, reducing the data rate of the digital audio stream by performing either one or both of:

reducing a sampling rate of the digital audio stream to a reduced sampling rate; and reducing a number of bits per sample of the digital audio stream to a reduced number of bits per sample.

2. The method of claim 1, further comprising:

identifying a frequency above which amplitude distortion of the sampled sound exceeds a predetermined amplitude distortion limit and phase distortion of the sampled sound exceeds a predetermined phase distortion limit, the identified frequency being referred to as an upper usable frequency; and computing, based on the upper usable frequency, a maximum usable sampling rate of the audio playback system, wherein the reduced sampling rate is determined on the basis of the computed maximum usable sampling rate.

3. The method of claim 2 wherein the determining of the upper usable frequency comprises:

transforming the sampled sound from a time domain to a frequency domain, the transforming resulting in the frequency spectrum of the sampled sound, the frequency spectrum comprising a frequency component in each of a plurality of frequency bins, the transforming yielding amplitude information and phase information regarding each of the frequency components; and using the amplitude and phase information regarding each of the frequency components, determining, for each of the frequency components of the frequency spectrum, an amplitude distortion and a phase distortion.

4. The method of claim 2 wherein the computing of the maximum usable sampling rate comprises setting the maximum usable sampling rate to twice the upper usable frequency.

5. The method of claim 2 further comprising determining the reduced sampling rate of the digital audio stream by rounding the maximum usable sampling rate of the audio playback system down to a closest standard sampling rate.

6. The method of claim 2 further comprising determining the reduced sampling rate of the digital audio stream by rounding the maximum usable sampling rate up to a closest standard sampling rate.

7. The method of claim 1, further comprising:

identifying a frequency above which amplitude distortion of the sampled sound exceeds a predetermined amplitude distortion limit and phase distortion of the sampled sound exceeds a predetermined phase distortion limit, the identified frequency being referred to as an upper usable frequency; and computing, based on a portion of a frequency spectrum of the sampled sound at or below the upper usable frequency, a maximum usable number of bits per sample of the audio playback system, wherein the reduced number of bits per sample is determined on the basis of the computed maximum usable number of bits per sample.

8. The method of claim 7 wherein the determining of the upper usable frequency comprises:

transforming the sampled sound from a time domain to a frequency domain, the transforming resulting in the frequency spectrum of the sampled sound, the frequency spectrum comprising a frequency component in each of a plurality of frequency bins, the transforming yielding amplitude information and phase information regarding each of the frequency components; and using the amplitude and phase information regarding each of the frequency components, determining, for each of the frequency components of the frequency spectrum, an amplitude distortion and a phase distortion.

9. The method of claim 7 wherein the computing of a maximum usable number of bits per sample of the audio playback system comprises:

measuring a total harmonic distortion and noise (THD+N) of the portion of the spectrum at or below the upper usable frequency; and converting the THD+N measurement to the maximum usable number of bits per sample.

10. The method of claim 7 further comprising determining the reduced number of bits per sample of the digital audio stream either by rounding the maximum usable number of bits per sample down to a closest standard number of bits per sample or by rounding the maximum usable number of bits per sample up to a closest standard number of bits per sample.

11. The method of claim 1 wherein the digital audio stream comprises uncompressed audio data or audio data that has been compressed using a lossless compression format.

12. A computing device configured for outputting a digital audio stream to an audio playback system for rendering as sound over speakers, the computing device comprising a processor, the processor operable to adjust a data rate of the digital audio stream by:

sampling the sound generated, from the digital audio stream, by the audio playback system;

ascertaining, from the sampling, a sound quality of the generated sound; and based at least in part on the ascertained sound quality of the generated sound, reducing the data rate of the digital audio stream by performing either one or both of:

reducing a sampling rate of the digital audio stream to a reduced sampling rate; and reducing a number of bits per sample of the digital audio stream to a reduced number of bits per sample.

13. The computing device of claim 12 wherein the processor is further operable to:

identify a frequency above which amplitude distortion of the generated sound exceeds a predetermined amplitude distortion limit and phase distortion of the generated sound exceeds a predetermined phase distortion limit, the identified frequency being referred to as an upper usable frequency; and compute, based on the upper usable frequency, a maximum usable sampling rate of the audio playback system, wherein the reduced sampling rate is determined on the basis of the computed maximum usable sampling rate.

14. The computing device of claim 13 wherein the processor is further operable to determine the reduced sampling rate of the digital audio stream either by rounding the maximum usable sampling rate of the audio playback system down to a closest standard sampling rate or by rounding the maximum usable sampling rate up to a closest standard sampling rate.

15. The computing device of claim 12 wherein the processor is further operable to:

identify a frequency above which amplitude distortion of the generated sound exceeds a predetermined amplitude distortion limit and phase distortion of the generated sound exceeds a predetermined phase distortion limit, the identified frequency being referred to as an upper usable frequency; and compute, based on a portion of a frequency spectrum of the generated sound at or below the upper usable frequency, a maximum usable number of bits per sample of the audio playback system, wherein the reduced number of bits per sample is determined on the basis of the computed maximum usable number of bits per sample.

16. The computing device of claim 15 wherein the processor is further operable to determine the reduced number of bits per sample of the digital audio stream either by rounding the maximum usable number of bits per sample down to a closest standard number of bits per sample or by rounding the maximum usable number of bits per sample up to a closest standard number of bits per sample.

17. A non-transitory tangible machine-readable medium storing instructions that, upon execution by a processor of a computing device, the computing device configured to output a digital audio stream to an audio playback system for rendering as sound over speakers, cause the processor to:

sample the sound generated, from the digital audio stream, by the audio playback system;

ascertaining, from the sampling, a sound quality of the generated sound; and based at least in part on the ascertained sound quality of the generated sound, reduce the data rate of the digital audio stream by performing either one or both of:

reducing a sampling rate of the digital audio stream to a reduced sampling rate; and reducing a number of bits per sample of the digital audio stream to a reduced number of bits per sample.

18. The machine-readable medium of claim 17 wherein the instructions further cause the processor to:

identify a frequency above which amplitude distortion of the generated sound exceeds a predetermined amplitude distortion limit and phase distortion of the generated sound exceeds a predetermined phase distortion limit, the identified frequency being referred to as an upper usable frequency;

compute, based on the upper usable frequency, a maximum usable sampling rate of the audio playback system; and compute, based on a portion of a frequency spectrum of the sampled sound at or below the upper usable frequency, a maximum usable number of bits per sample of the audio playback system, wherein the reduced sampling rate is determined on the basis of the computed maximum usable sampling rate, and wherein the reduced number of bits per sample is determined on the basis of the computed maximum usable number of bits per sample.

19. The machine-readable medium of claim 18 wherein the instructions further cause the processor to:

display, at the computing device, a graphical user interface (GUI) comprising at least one of:

an indication of the computed maximum usable sampling rate of the audio playback system; or an indication of the computed maximum usable number of bits per sample of the audio playback system.

20. The machine-readable medium of claim 18 wherein the instructions further cause the processor to:

display, at the computing device, a graphical user interface (GUI) comprising at least one of:

an indication of the reduced sampling rate that has been determined on the basis of the computed maximum usable sampling rate of the audio playback system; and an indication of the reduced number of bits per sample that has been determined on the basis of the computed maximum usable number of bits per sample of the audio playback system.

* * * * *